(12) United States Patent
Itzkowitz

(10) Patent No.: US 10,880,602 B2
(45) Date of Patent: Dec. 29, 2020

(54) METHOD OF OBJECTIVELY UTILIZING USER FACIAL EXPRESSIONS WHEN VIEWING MEDIA PRESENTATIONS FOR EVALUATING A MARKETING CAMPAIGN

(71) Applicant: Jinglz, Inc., Boynton Beach, FL (US)

(72) Inventor: Aaron Itzkowitz, Boynton Beach, FL (US)

(73) Assignee: JINGLZ INC., Boynton Beach, FL (US)

( * ) Notice: Subject to any disclaimer, the term of this patent is extended or adjusted under 35 U.S.C. 154(b) by 0 days.

(21) Appl. No.: 16/835,216

(22) Filed: Mar. 30, 2020

(65) Prior Publication Data

US 2020/0236430 A1   Jul. 23, 2020

Related U.S. Application Data

(60) Continuation-in-part of application No. 16/827,649, filed on Mar. 23, 2020, and a continuation-in-part of application No. 16/014,274, filed on Jun. 21, 2018, now Pat. No. 10,609,450, said application No. 16/827,649 is a division of application No.
(Continued)

(51) Int. Cl.
| | |
|---|---|
| *H04H 60/33* | (2008.01) |
| *H04H 60/56* | (2008.01) |
| *H04N 21/442* | (2011.01) |
| *G06K 9/00* | (2006.01) |
| *G06F 3/01* | (2006.01) |
| *H04N 21/466* | (2011.01) |
| *H04N 21/4223* | (2011.01) |

(52) U.S. Cl.
CPC ....... *H04N 21/44218* (2013.01); *G06F 3/013* (2013.01); *G06K 9/00308* (2013.01); *H04N 21/4223* (2013.01); *H04N 21/4667* (2013.01)

(58) Field of Classification Search
CPC ......... H04N 21/44218; H04N 21/4223; H04N 21/4667; G06F 3/013; G06K 9/00308
See application file for complete search history.

(56) References Cited

U.S. PATENT DOCUMENTS

| | | | |
|---|---|---|---|
| 2006/0044479 A1 | 3/2006 | Heo | |
| 2012/0222058 A1* | 8/2012 | el Kaliouby | H04N 21/251 725/10 |

(Continued)

*Primary Examiner* — Kyu Chae
(74) *Attorney, Agent, or Firm* — Mark C. Johnson; Johnson Dalal

(57) ABSTRACT

The present invention is directed to a computer-implemented method and system for analyzing a user's facial responses to determine a user's approval or disapproval of a marketing campaign. Such a system may comprise open-source or commonly-implemented facial recognition hardware and software on smartphones, tablets, or computers, and may interface with the media-playing hardware on such devices. The system and method causes display of one or more media presentations to a plurality of users for measuring their facial gestures, wherein these facial gestures are associated with an approval or disapproval of one or more portions of the one or more media presentations. These face gestures may be recorded in a central server for data related to the individual and users in the aggregate and/or may be sent back to the developer of the one or more media presentations for analysis and/or editing.

9 Claims, 14 Drawing Sheets

Related U.S. Application Data

16/014,274, filed on Jun. 21, 2018, now Pat. No. 10,609,450.

(60) Provisional application No. 62/545,722, filed on Aug. 15, 2017.

(56) References Cited

U.S. PATENT DOCUMENTS

| | | | |
|---|---|---|---|
| 2015/0208125 A1* | 7/2015 | Robinson | H04N 21/4436 725/12 |
| 2017/0243055 A1* | 8/2017 | Naveh | G06F 16/5866 |

* cited by examiner

METHOD OF OBJECTIVELY UTILIZING USER FACIAL EXPRESSIONS WHEN VIEWING MEDIA PRESENTATIONS FOR EVALUATING A MARKETING CAMPAIGN

PRIORITY NOTICE

This is a continuation-in-part application to pending U.S. nonprovisional patent application Ser. No. 16/014,274, filed Jun. 21, 2018, which claims priority to U.S. provisional patent application 62/545,722, filed on Aug. 15, 2017, the entirety of both are incorporated herein by reference. This is also a continuation-in-part application to pending U.S. nonprovisional patent application Ser. No. 16/827,649, filed Mar. 23, 2020, which is a divisional application to U.S. nonprovisional patent application Ser. No. 16/014,274, filed Jun. 21, 2018, which claims priority to U.S. provisional patent application 62/545,722, filed on Aug. 15, 2017, the entirety of both are incorporated herein by reference.

TECHNICAL FIELD OF THE INVENTION

The present invention relates to computer-implemented systems and methods to evaluate marketing campaigns, and, more specifically, relates to computer-implemented systems and methods to evaluate marketing campaigns utilizing user facial expressions.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Conventional video interfaces are limited either by requiring physical user input, such as a person's hand, which may be used to interact with an input device such as a mouse, keyboard, trackpad, or touchscreen, or speech recognition, which may either understand the words the person is saying or which may determine a person's emotional affect or mental state in order to determine approval or disapproval for the displayed content. In the case of the former, a user must have a hand free to interact with the input method, or, in the latter, must be able to speak clearly in order to interact with a media presentation. With emotional affect or mental state voice recognition, there may not be any background noises that may register a false positive reading. This is often impossible in public settings such as on public transportation, at public events, at fitness centers, or even while a third-party is talking to the user. Also, for speech recognition, an artificial intelligence system must be able to understand the speaker, which may be difficult to record if a media presentation is playing simultaneously on the same device.

It is known to have a system for reading facial expressions that may categorize such expressions into seven different primary categories, such categories including happiness, sadness, contempt, disgust, surprise, fear, and anger. Such expressions may be identified by measuring changes in movement of certain facial features, namely the corners of the mouth, the corners of the eyes, the vertical position of the eyebrows, the prominence of the cheeks, and the furrows of the forehead.

It is known to have a facial recognition software which may be used on a smartphone, tablet, or computer, and which may read a plurality of facial landmarks on a user's face. Such a software may use such facial landmarks to read the position of and changes in position of various facial muscles associated with facial expressions. Such a software may read facial expressions in still photos or may read facial expressions in real time. Such readings may be displayed on a chart of measured landmarks over time to determine a correlation with the movements of particular facial muscles and their association with specific facial expressions.

It is known to have a facial recognition software which may be used to determine a progression of video sequences based on a user's facial expressions. Such a software may include information on one or more of a group consisting of facial expressions, action units, head gestures, smiles, brow furrows, squints, lowered eyebrows, raised eyebrows, smirks, and attention. The physiological data may include one or more of electrodermal activity, heart rate, heart rate variability, skin temperature, and respiration. The method may further comprise inferring of mental states based on the mental state data which was collected. The mental states may include one of a group consisting of frustration, confusion, disappointment, hesitation, cognitive overload, focusing, being engaged, attending, boredom, exploration, confidence, trust, delight, valence, skepticism, and satisfaction. The playing of the first media presentation may be done on a mobile device and further comprising recording of facial images with the mobile device as part of the capturing of the mental state data.

There is a need in the art for a computer-implemented method and system for analyzing a user's facial responses to determine an appropriate progression of outputs and for objectively evaluating marketing campaigns.

It is to these ends that the present invention has been developed.

BRIEF SUMMARY OF THE INVENTION

To minimize the limitations in the prior art, and to minimize other limitations that will be apparent upon reading and understanding the present specification, the present invention describes a computer-implemented method and system for analyzing a user's facial responses to determine an appropriate progression of outputs.

It is an objective of the present invention to provide a facial response system that may comprise facial recognition hardware.

It is another objective of the present invention to provide a facial response system that may further comprise facial recognition software.

It is another objective of the present invention to provide a facial response system that may further comprise eye-tracking hardware.

It is another objective of the present invention to provide a facial response system that may further comprise eye-tracking software.

It is another objective of the present invention to provide a facial response system that may further comprise a media database.

It is another objective of the present invention to provide a facial response system that may further comprise a media displaying device.

It is another objective of the present invention to provide a facial response system that may further comprise a database of user feedback.

It is another objective of the present invention to provide a facial response system that may advance video playback.

It is another objective of the present invention to provide a facial response system that may pause video playback.

These and other advantages and features of the present invention are described herein with specificity so as to make the present invention understandable to one of ordinary skill in the art, both with respect to how to practice the present invention and how to make the present invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The present invention relates generally to data processing, and, more specifically, to a computer-implemented method and system for analyzing a user's facial responses to determine an appropriate progression of outputs.

Figure 1:
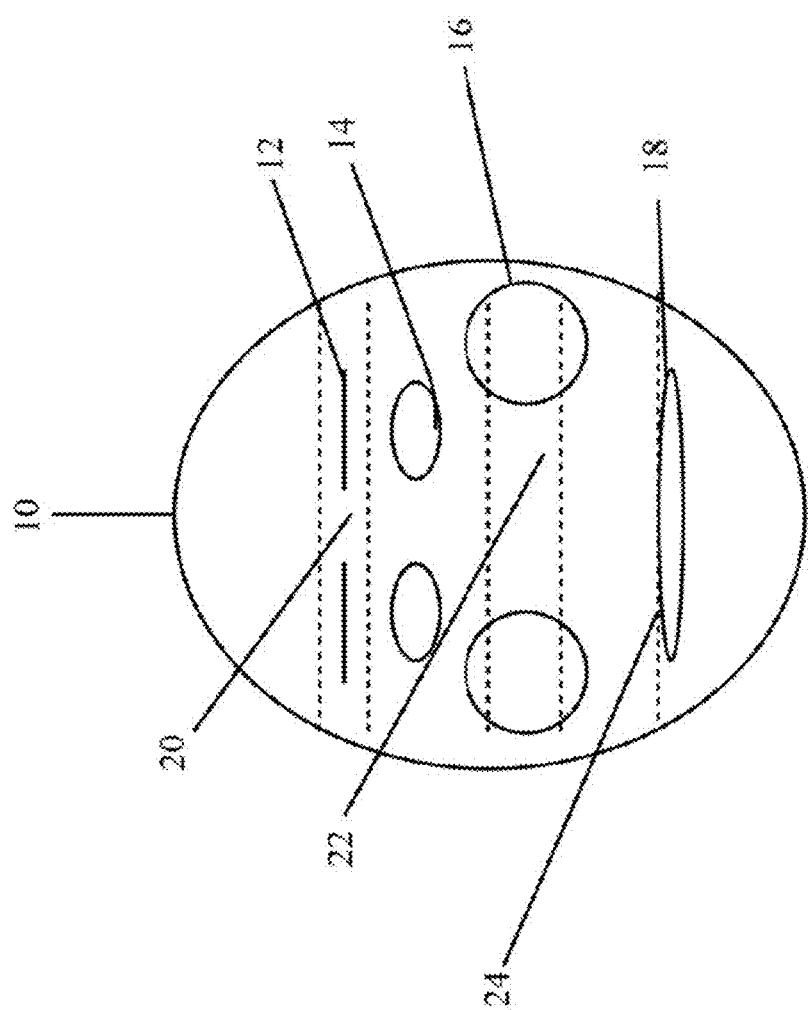
FIG. 1 illustrates a perspective view of the portions of a user's face associated with expression.

Referring now to the invention in more detail, in FIG. 1 there is shown the rough geometric shape of a person's face 10 with detail given to the eyebrows 12, eyes 14, cheeks 16, and mouth 18. The face can initially be detected using available open source facial recognition and detection systems. Such a system may comprise a camera device and camera software, and may be any system in common usage on the market or may be any system already commonly implemented on smartphones, tablets, and computers.

In further detail, still referring to FIG. 1, the person's face associated with the physical markers above has been arbitrarily divided into the following three sections: eyebrow furrows 20, raised cheeks 22, and raised or sunken corners of the mouth 24. The variables in these quadrants can be written into a conditional mathematical formula to determine the aggregate resulting facial response; either a frown or smile.

By way of a first example, a frown may be determined by a decreased measure on the baseline in quadrant 20, which may be associated with downturned eyebrows, combined with a decrease in quadrant 24, which may be associated with downturned corners of the mouth, with no change in quadrant 22.

By way of a second example, a smile may be determined by an increased measure on the baseline in quadrant 24, which may be associated with upturned corners of the mouth, combined with an increased measure on the baseline of quadrant 22, which may be associated with elevated cheeks, with no change in quadrant 20.

Figure 2:
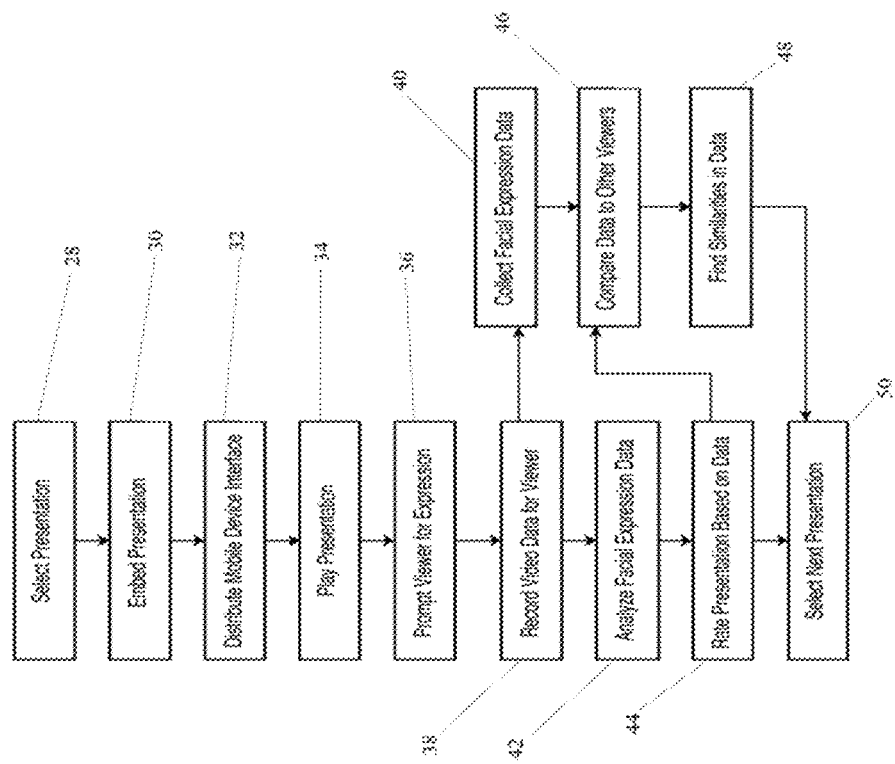
FIG. 2 schematically illustrates a flow diagram for displaying a media presentation.

FIG. 2 is a flow diagram for displaying a media presentation, which may specifically be a short video commercial. The presentation is selected to be viewed on a mobile device initially by the viewer 28. Next, the presentation is embedded to the video player of the device 30. The presentation is then distributed to the mobile device interface 32 and the presentation is played on the display screen of the device 34. Using open source eye-tracking and pupil-tracking software, the hardware and software combination may be able observe the viewer's eyes and determine, based on any appropriate or commonly-used measure, that the viewer is looking at the display screen. Once the application has determined that the viewer is looking directly at the screen, the viewer is promoted to elicit an intentional facial response such as a frown or smile showing approval or disapproval of the media presentation 36. If the viewer does not elicit a measurable response, then the viewer will be prompted for one again once the viewer's eye-gaze can be detected until a facial response is measured. Next, the viewer's facial response is recorded 38, measured, and transposed to data 40 via the mobile device's user-facing camera. If there is not enough lighting in the room to measure a response then the brightness of the screen on the mobile device may be controlled by the software, and the brightness may be increased to light up the person's face. The data is then analyzed using the conditional mathematical formula, as discussed above, to determine if the person elicited a smile (approval response) or frown (disapproval response) 42. While that is occurring, the facial response data is transcribed to a shared computer database either located on a remote server or cloud-based computer and compared and contrasted with other viewers to find similarities in facial expression responses 46. The viewer can be categorized in the database by demographics and the application can begin logging which media presentations the viewer likes or dislikes. That data can then be compared to other similar viewers in order to look for similarities between viewers 48. Once the presentation has been rated as either desirable or undesirable 44, through the input of either a smile or a frown, respectively, a new media presentation will be chosen based on the analyzed data of the viewer 50. The media presentation can be a video commercial or short video clip. The brevity of the video is crucial in keeping the viewer engaged and measuring facial response.

Figure 3:
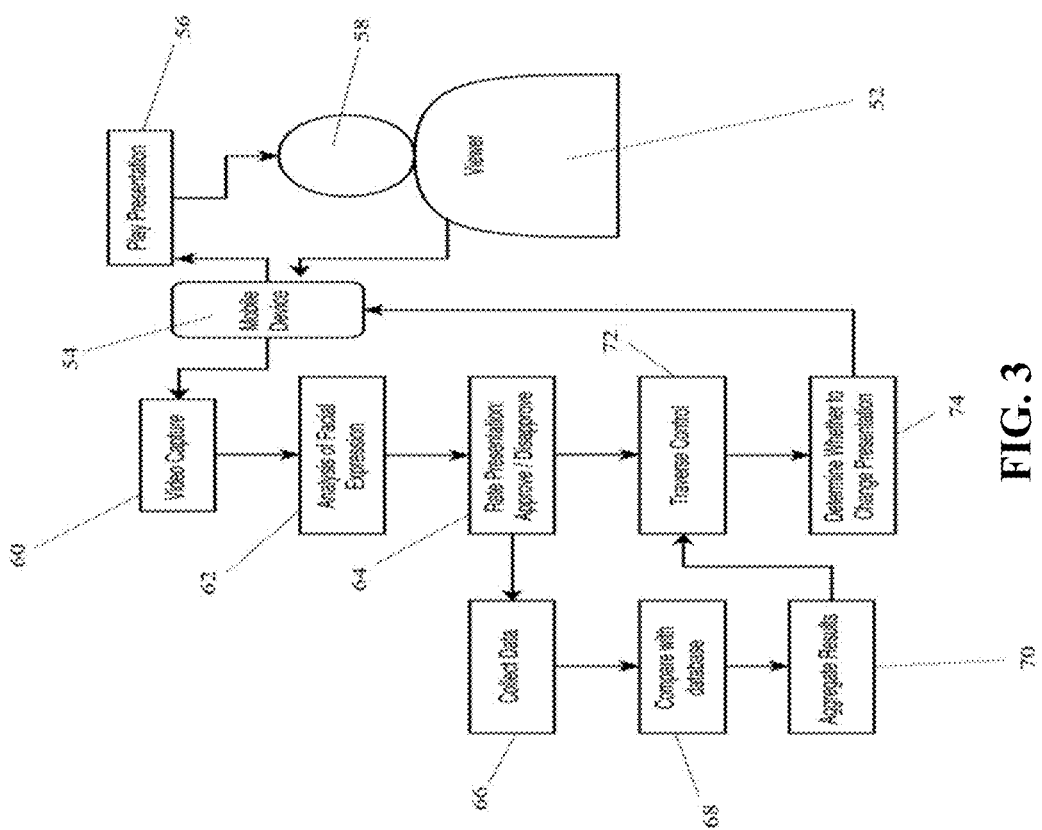
FIG. 3 schematically illustrates a system for capturing facial response data to a media presentation.

Referring now to FIG. 3, this is a system for capturing facial responses to a media presentation. The media presentation is selected to be viewed on a mobile device 54 initially by the viewer 58. Next, the mobile device's front facing camera records and captures the viewer's face 60, transposes the data, and analyzes the result as a facial expression 62. It then rates the purposeful response as either a smile (approval) or a frown (disapproval) 64. The mobile device then transcribes the data to a shared database on a remote computer server or cloud-based server 66 for access by the same application on other devices. Then, the data can be compared and contrasted to other stored data for similar viewers 68, and the results can be collected and compiled 70. This allows the mobile device player to traverse control as a means of hands-free input 72 and determine whether to change the media presentation on its own 74. If the viewer expresses approval then the media presentation will not be changed, but if the viewer expresses disapproval then the media presentation will be accordingly changed and may be changed to a more desirable video based on the collected data available in the database.

Figure 4:
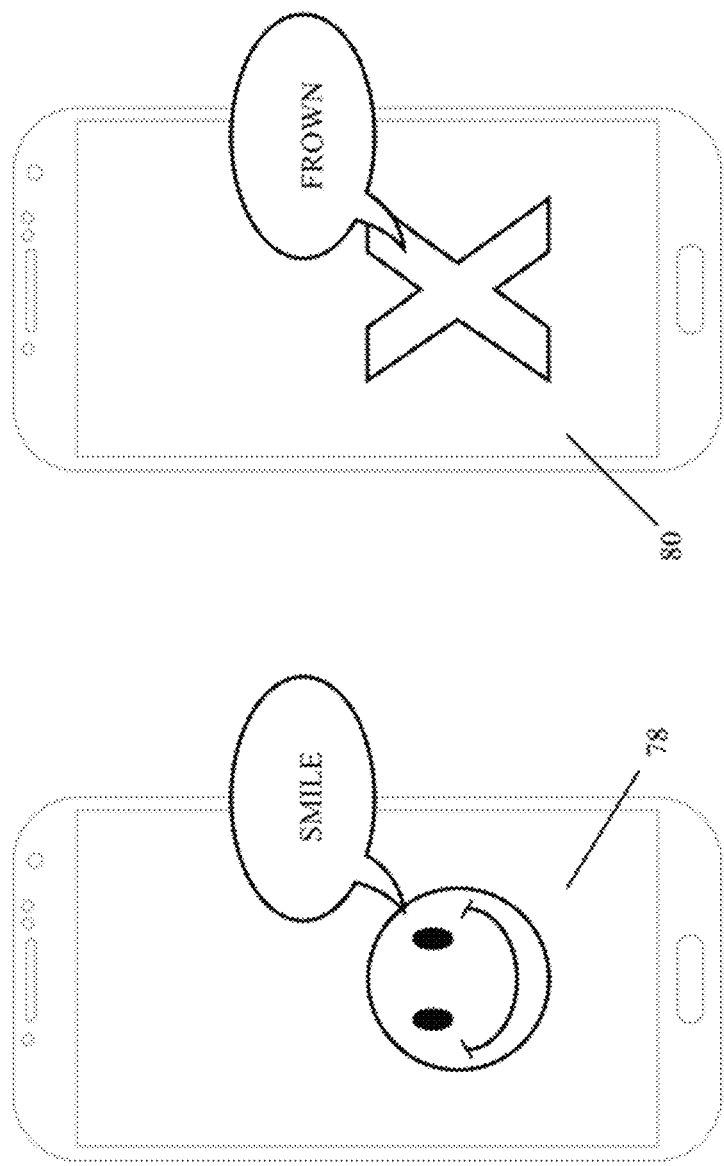
FIG. 4 illustrates a method for eliciting facial response to a media presentation for recorded video user input via a forward-facing mobile device camera.

Referring now to FIG. 4, this is method for prompting facial response from recorded video user input via a mobile device's user-facing camera. Using open source eye tracking and pupil-tracking software, once the application has determined that the viewer is looking directly at the screen during the presentation playback, the viewer will be prompted to either smile for approval 78 or frown for disapproval 80. This Figure is for illustrative purposes only and should not be seen as limiting the graphical design. If the viewer does not elicit a measurable response, then the viewer will be prompted for one again once the application is able to reacquire eye-gaze. If there is not enough lighting in the room to measure a response, then the brightness of the screen on the mobile device can be increased to light up the person's face. In one embodiment, the prompt could be a small gray-scale icon appearing in a corner of the screen that is superimposed on top of the video that is playing, similar to a watermark or popup.

Figure 5:
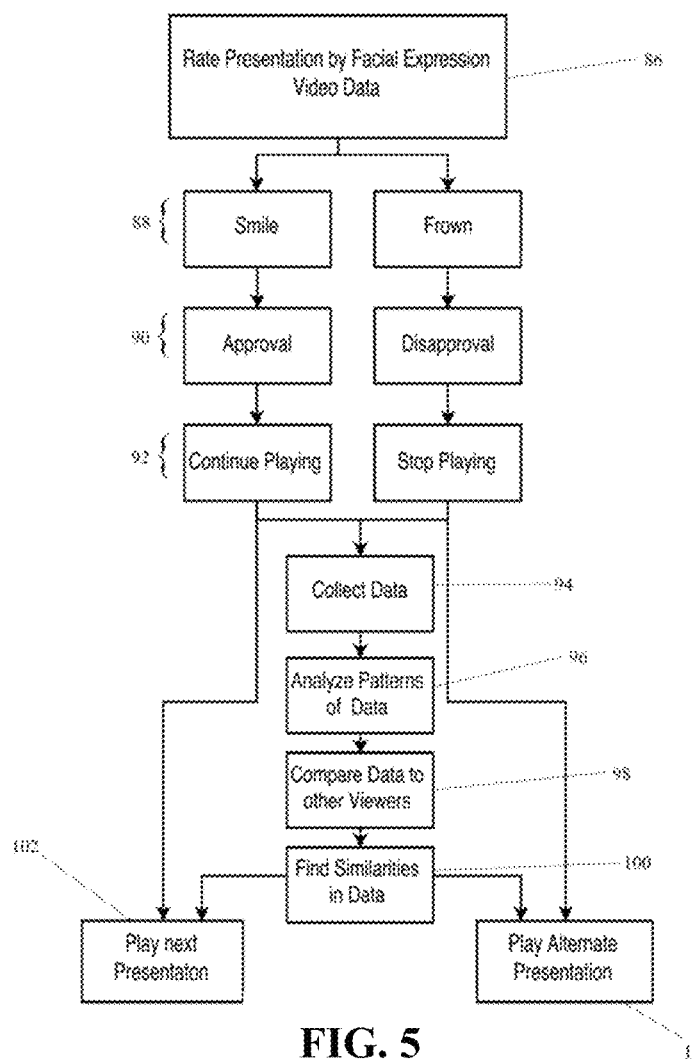
FIG. 5 schematically illustrates a graphical representation of categorizing a facial response as a method of hands-free user input.

Referring now to FIG. 5, this is a graphical representation of categorizing a facial response as user input. Once the media presentation has been played there is a simple conditional formula for determining whether the presentation should continue to play or whether a more suitable presentation should be played instead, as discussed above. As such, the presentation will be rated by intentional facial response video data 84. The viewer will be given the option of either smiling or frowning 86. A smile will be quantified with approval, and a frown with disapproval 88. As such, the video will continue playing for an approval response while it will stop playing and be changed for a disapproval 90. For approval, the next video can be played sequentially without further processing 102. Or, however, for either approval or disapproval, data can be collected and contrasted with a database of other viewers stored on either a remote computer server or cloud-based server 98. Those patterns of data such as viewer demographics and presentations being watched can be compared and contrasted in order to fine tune commercial programming 100. The data can be compared with other viewers 98 to find similarities and make recommendations based on similarities between the viewers, such as demographics and facial responses to the videos 100. The next presentation can then be customized to the viewer based on the findings 104 and the viewer can be prompted for an intentional facial response to view a recommendation or not 86.

The advantages of the present invention include, without limitation, no bodily movement or speech required of the viewer, whether it be a hand movement, gesture, voice, or determining a person's psychological affect or state of mind while playing targeted media presentations. The invention is also an alternate means for persons with physical and psychological disabilities to express either satisfaction or dissatisfaction with commercial programming.

The design of the current system allows a viewer to use facial responses in crowded public areas where video commercials are often times viewed as a "pastime." Unlike emotional affect or mental state systems that are designed for lengthy videos and which may be inaccurate in not taking into account confounding variables such as external environmental stimuli (such as a dog barking or someone speaking in the background), which are actually causing the viewer's facial responses, this system intentionally prompts the viewer to either frown, showing disapproval and thereby stop the media presentation, or smile, to continue viewing the presentation.

Figure 6:
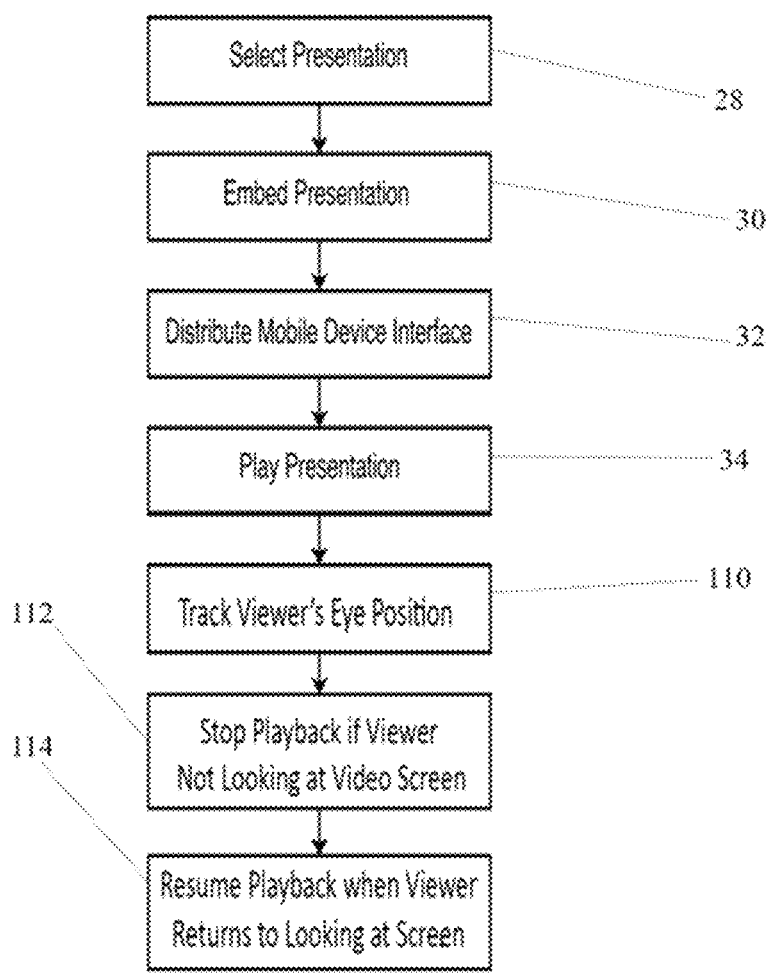
FIG. 6 schematically illustrates a flow diagram for displaying a media presentation based on viewer eye position.
Figure 7:
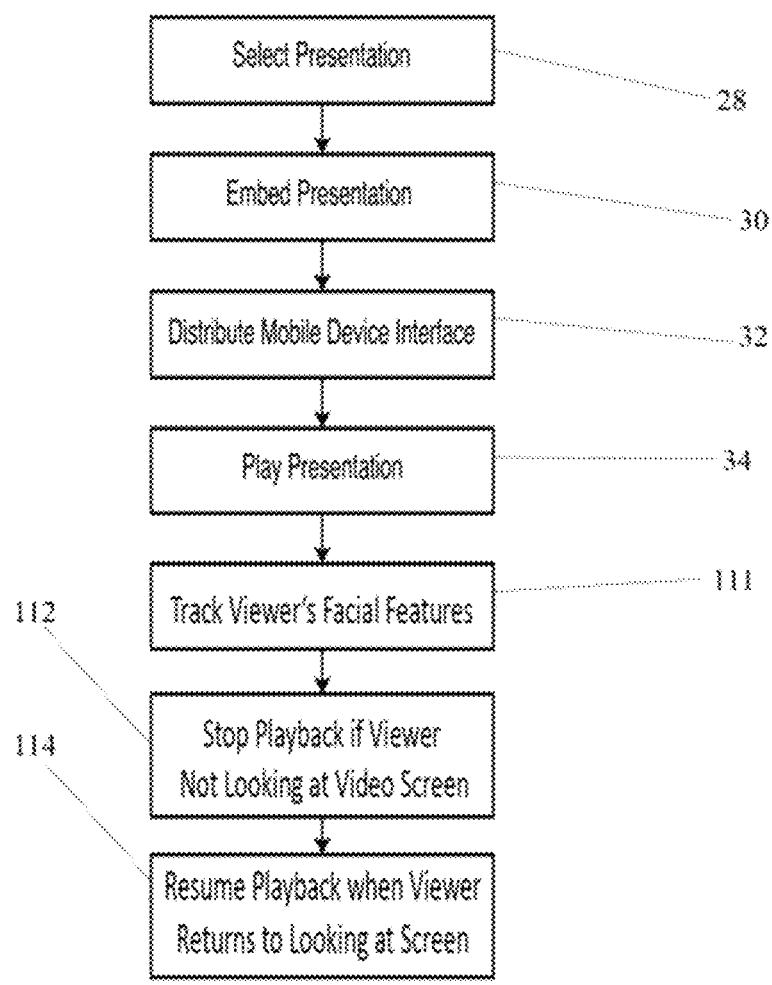
FIG. 7 schematically illustrates a flow diagram for displaying a media presentation based on viewer facial features.

FIGS. 6 and 7 schematically illustrate a flow diagram for displaying a media presentation based on viewer eye position or viewer facial features. In another embodiment of the present invention, the viewer may be prompted to begin a video presentation 28, and the facial recognition and eye-tracking equipment of the device may be attuned to track the user's eye position 110 or facial features 111 to ensure that the user is looking at the screen playing the video. Such a tracking may involve measuring the expected symmetry of the cheeks or relative positions of the eyes as compared to other facial landmarks, or any other means known in the art. The looking of the user at the video screen may permit the video to continue playback, while the looking away of the user from the video screen may cause the video playback to pause 112. The video playback may continue when the user resumes looking at the screen 114. Such a condition may ensure that a user is actually engaging the video being played, as opposed to starting the video and occupying themselves with another task. Within the present system such a feature may improve the accuracy of the results drawn from the prompted user responses, and may also ensure the delivery of advertising videos or educational videos to a user of the system.

Figure 8:
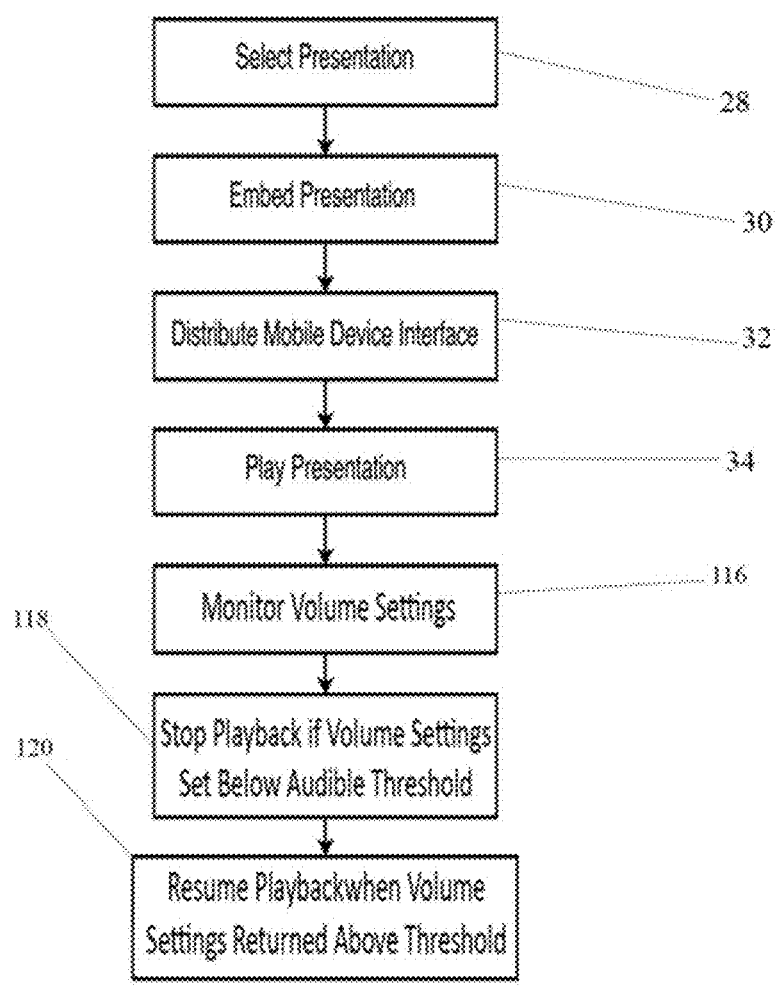
FIG. 8 schematically illustrates a flow diagram for displaying a media presentation based on volume settings.

FIG. 8 schematically illustrates a flow diagram for displaying a media presentation based on volume settings. In a second variation of such an embodiment, video playback may be correlated with the user-set volume 116, whereas if a user should reduce or mute the volume on a video the playback may automatically pause 118. The playback of the video may be resumed once the volume has returned to normal levels or has been unmuted 120.

In a third variation of such an embodiment, video playback may be correlated with the gyroscope built into the mobile device playing the video such that, if a user were to invert the mobile device video playback would pause automatically until the device is returned to an upright orientation.

Figure 9:
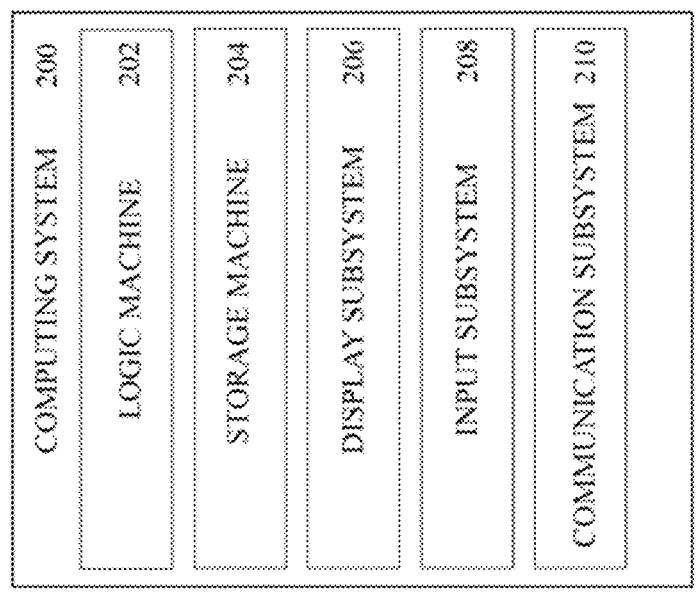
FIG. 9 schematically presents a computing system configured to carry out and actualize methods and tasks described herein.

FIG. 9 schematically presents a computing system that may represent an embodiment of the present invention. In some embodiments the method is executed on a computing system such as computing system 200 of FIG. 9. For example, storage machine 204 may hold instructions executable by logic machine 202 to provide the method to users. Display subsystem 206 may display the various elements of the method to participants. For example, display subsystem 206, storage machine 204, and logic machine 202 may be integrated such that the method may be executed while being displayed on a display screen. The input subsystem 208 may receive user input from participants to indicate the various choices or user inputs described above. The described method may be executed, provided or implemented to a user on one or more computing devices via a computer-program product such as via an application programming interface (API). FIG. 9 schematically shows a non-limiting exemplary embodiment of a computing system 200 that can enact the method described above. Computing system 200 may be any appropriate computing device such as a personal computer, tablet computing device, gaming device or console, mobile computing device, etc. Computing system 200 includes a logic machine 202 and a storage machine 204. Computing system 200 may include a display subsystem 206, input subsystem 208, and communication subsystem 210. Logic machine 202 may execute machine-readable instructions via one or more physical devices. For example, the logic machine 202 may be configured to execute instructions to perform tasks for a computer program. The logic machine may include one or more processors to execute machine-readable instructions. Storage machine 204 includes one or more physical devices configured to hold or store instructions executable by the logic machine to implement the method. When such methods and processes are implemented, the state of storage machine 204 may be changed to hold different data. For example, storage machine 204 may include memory devices such as various hard disk drives or CD or DVD devices. Display subsystem 206 may visually present data stored on storage machine 204. For example, display subsystem 206 may visually present data to form a graphical user interface (GUI). Input subsystem 208 may be configured to connect and receive input from devices such as a mouse, keyboard, or gaming controller. Communication subsystem 210 may be configured to enable system 200 to communicate with other computing devices. Communication subsystem 210 may include wired and/or wireless communication devices to facilitate networked communication.

Figure 10:
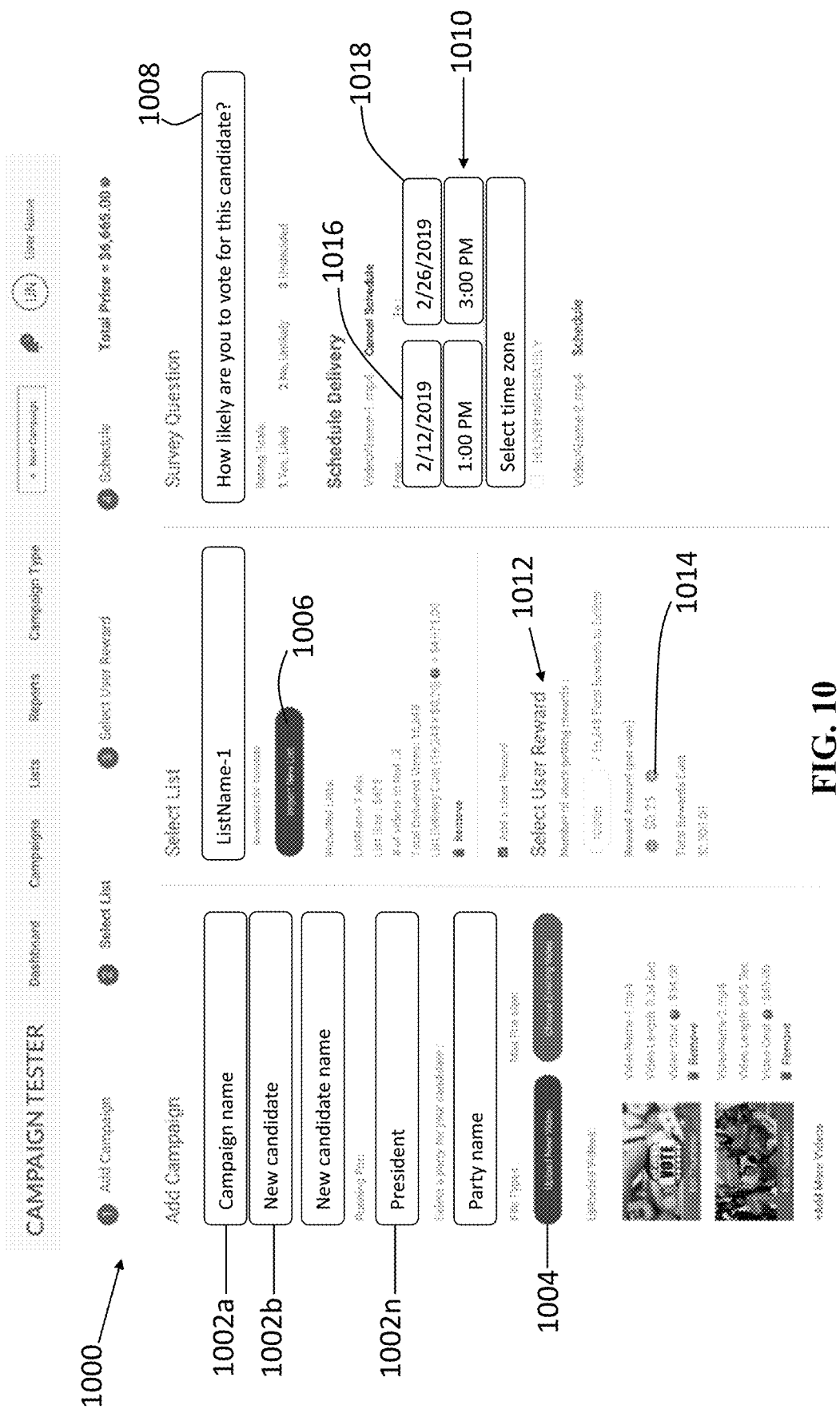
FIG. 10 depicts a graphical user interface for a marketing user implementing a method and system of objectively utilizing user facial expressions when viewing media presentations for evaluating a marketing campaign testing platform in accordance with one embodiment of the present invention.
Figure 11:
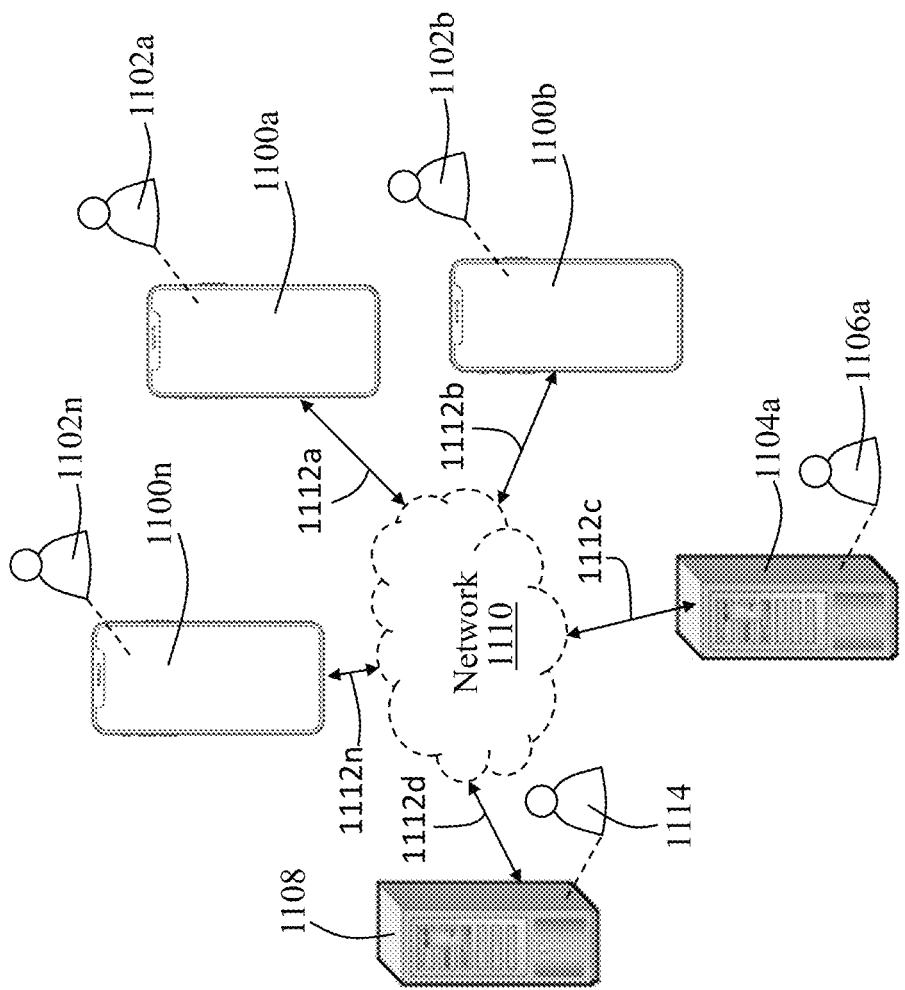
FIG. 11 depicts an exemplary network of users communicatively coupled together for implementing a method and system of objectively utilizing user facial expressions when viewing media presentations for evaluating a marketing campaign testing platform in accordance with one embodiment of the present invention.

With reference now to FIGS. 10-11, a graphical user interface and block diagram for implementing a computer-implemented method of utilizing user facial expressions when viewing digital media over a network for evaluating a marketing campaign marketing user is respectively depicted. The method and system are implemented using some or all of the techniques and methods described above. The process and schematic flow diagrams in FIG. 13-14 also respectively depict the aforementioned computer-implemented method.

More specifically, the process and system may include providing a plurality of mobile electronic computing devices 1100*a*-*n* for a plurality of users 1102*a*-*n*, wherein "n" represents any number greater than one. The plurality of mobile electronic computing devices 1100*a*-*n* may be a cellphone, tablet, etc. Each of the plurality of mobile electronic computing devices 1100*a*-*n* include, however, a display screen, a camera, and a media player for carrying out one or more aspect(s) of the present invention. The process and system may also include providing an electronic computing device 1104*a*-*n* of one or more marketing user(s) 1106*a*-*n*. The electronic computing device 1104*a*-*n* may include a cellphone, tablet, personal computer, etc. The marketing user 110 is the individual(s) responsible for creating a digital media presentation, e.g., digital media presentation 1020 represented in the form an .mp4 file, and who would otherwise like to see objective feedback from a plurality of users viewing the digital media presentation before formally and/or widely disseminating the digital media presentation (or some edited version of the same).

The process and system may also include providing a central database 1108 communicatively coupled with the plurality of mobile electronic computing devices 1100*a-n* and the electronic computing device 1104*a-n* of the marketing user 1106*a-n* over a network 1110. The central database 1108 may be controlled and managed by an administrator that may be responsible for updating and controlling a marketing review software application (exemplified in FIG. 10). The exemplary network 1110 depicted in FIG. 11 includes connections 1112*a-n*, which are the medium used to provide communications links between various devices and computers connected together within the network 1110. The connections 1112*a-n* may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example in FIG. 11, the network 1110 can include the Internet, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network 1110 also may be implemented as a number of different types of networks, such as for example, an Intranet, a local area network (LAN), or a wide area network (WAN). FIG. 11 is intended as an example, and not as an architectural limitation for the present invention. The network 1110 may include additional servers and other devices and entities not shown.

The process may include receiving and storing, on the central database 1108, a digital media presentation from the electronic computing device 1104*a-n* of the marketing user 1106*a-n* and a plurality of user accounts each respectively associated with a plurality of users 1102*a-n* respectively associated with the plurality of mobile electronic computing devices 1100*a-n*. The plurality of plurality of users 1102*a-n* have an electronic communication protocol associated therewith, wherein the electronic communication protocol may be provided by the marketing user(s) 1106 and/or the plurality of users 1102*a-n*.

The process may also include communicating a digital media viewing request to the plurality of plurality of users 1102*a-n* using the respective electronic communication protocol associated therewith. In one embodiment, the marketing review software application installed on the marketing user 1106 computing device 1104 communicates the digital media viewing request to the plurality of users 1102*a-n*. In other embodiments, a software program resident on the central database 1108 may communicate said digital media viewing request. The digital media viewing request has an associated hyperlink for accessing and viewing the digital media presentation.

Next, the process includes initiating a marketing review software application resident on the plurality of mobile electronic computing devices 1100*a-n*, through the digital media viewing request, the marketing review software application having eye-tracking software and facial recognition software operably configured to recognize a plurality of facial expressions of a user with a user baseline. Next, the process includes confirming sight by at least one of the plurality of users 1102*a-n* using the eye-tracking software and using the camera on the user(s) 1102*a-n* respective devices 1100*a-n*. Thereafter, the process includes publishing, on the at least one of the plurality of users 1102*a-n* and through the marketing review software application, the digital media presentation through the media player on the display screen for a viewing interval.

Thereafter, and while confirming sight of the at least one of the plurality of users 1102*a-n* and during the viewing interval, the method and system includes capturing and recording, through the facial recognition software, at least one of the plurality of facial expressions of the at least one of the plurality of users 1102*a-n*. Then, the method and system include communicating the at least one of the plurality of facial expressions of the at least one of the plurality of users 1102*a-n* to the electronic computing device 1104*a-n* of the marketing user 1106*a-n* for review and analyzing.

With the above process describes, FIG. 10 depicts an exemplary testing platform 1000 intended to provide one or more marketing users 1106*a-n* with a method of market testing the appeal and projected profitability of any given marketing or advertising campaign. This may be accomplished by transmitting one or more selected digital media presentations 1004, or files, ("selected media 1004") to a plurality of registered users or viewers 58*a-n* or users 1102*a-n*. Pursuant to the inventive method and as also depicted in FIG. 3, the plurality of registered users 58*a-n* view the selected media 1004 and the facial response data gathered therein is transmitted back to the marketing user(s) who sent said media presentation through the testing platform 1000 generated by the marketing review software application. The marketing user is thereby able to evaluate the market approval or disapproval of the selected media 1004 and evaluate the projected success of the selected media 1004 among the general public.

The plurality of data input selections 1002*a-n* may relate to various information topics or groups, including, but not limited to, the selected media 1004, the plurality of registered users 58*a-n*, a survey question 1008, and a schedule delivery 1010. The plurality of data input selections 1002*a-n* relating to the plurality of registered users 58*a-n* comprises an input area for the upload of an aggregate list 1006 of a plurality of user contact information, which may be in the form of electronic mailing addresses, mobile application account numbers, social media account names or links, or other unique identifiers, i.e., an electronic communication protocol, associated with each specific end users 1102*a-n*. The plurality of user contact information contained within the aggregate list 1006 may differ in various embodiments of the present invention, but the goal of the aggregate list 1006—to transmit the selected media 1004 to the plurality of registered users 58*a-n* and receive facial response data in return—would still be accomplished.

A user reward input area 1012 may require the marketing user to select a compensation value 1014 to be received by a designated number of the plurality of registered users 58*a-n* upon the completed viewing of the selected media 1004. Said another way, the system and method may include communicating a digital gift card redemption link along with the digital media viewing request to the electronic communication protocol associated with the plurality of plurality of users 1102*a-n*, wherein the digital gift card redemption link accessible only after completed viewing of the digital media presentation 1004. The marketing user may selectively choose the compensation value 1014 to be assigned, as well as the number of the plurality of registered users 58*a-n* to receive the compensation value 1014 upon the completed viewing of the selected media 1004. In different embodiments, the compensation value 1014 may reflect a variety of different compensatory methods, including a direct cash value or a point-based system of designating a cash value. The administrative user may then distribute the accrued compensation values 1014 to the plurality of registered users 58*a-n*.

The marketing user may further selectively choose the plurality of registered users 58*a-n* to receive an invitation, via an electronic link, to view the selected media 1004. The marketing user may base this choice upon a random selection of a set quantity of registered users 58 or upon a predetermined set of responses as disclosed by the plurality of registered users 58*a-n* in an initial user registration 1100.*f*

Figure 12:
FIG. 12 depicts a graphical user interface for a viewing user implementing the method and system of objectively utilizing user facial expressions when viewing media presentations for evaluating a marketing campaign testing platform in accordance with one embodiment of the present invention.

Referring now to FIG. 12, the initial user registration 1200 comprises a set of questions related to discerning relevant data points associated with the user 58 such as the user's first and last name, electronic mailing address, mobile number, zip code, birth year, and gender. The administrative user or marketing user may selectively modify the questions asked so as to reflect the data points most relevant to the campaign at issue. The answers given by the plurality of registered users 58*a-n* in their initial user registration 1200 may be evaluated by the marketing user to determine which specific users 58 shall receive an invitation, via an electronic link, to view the selected media 1004.

Turning again to FIG. 10, the plurality of data input selections 1002*a-n* relating to the selected media 1004 may inquire into the details of the campaign effort, such as the candidate name, party, and other relevant details. While the plurality of data input selection 1002*a-n* in FIG. 10 reflect a campaign revolving around a political candidate, the specific campaign or marketing effort is readily modifiable in accordance with the needs of each marketing user. The marketing user must then upload a selected media 1004, which may be in a AVI (Audio Video Interleave), WMV (Windows Media Video), FLV (Flash Video Format), MOV (Apple Quick-Time Movie), MP4 (Moving Pictures Expert Group 4), or other compatible video file format, onto the testing platform 1000.

The survey question 1008 may also be selectively modified by the marketing user to focus on the main point or feedback the marketing user aims to receive from the plurality of users 58*a-n*. The marketing user may also designate a specific schedule delivery 1010, delineating a start date and time 1016 and an end date and time 1018 for the campaign. During the window of time designated in the schedule delivery 1010, the selected media 1004 will remain open and active for the plurality of registered users 58*a-n* to view the selected media 1004. When the window of time expires, the invitation, via an electronic link, sent to the plurality of registered users 58*a-n* will no longer be active and will no longer be capable of providing access to the selected media 1004 for viewing by the plurality of registered users 58*a-n*.

Figure 13:
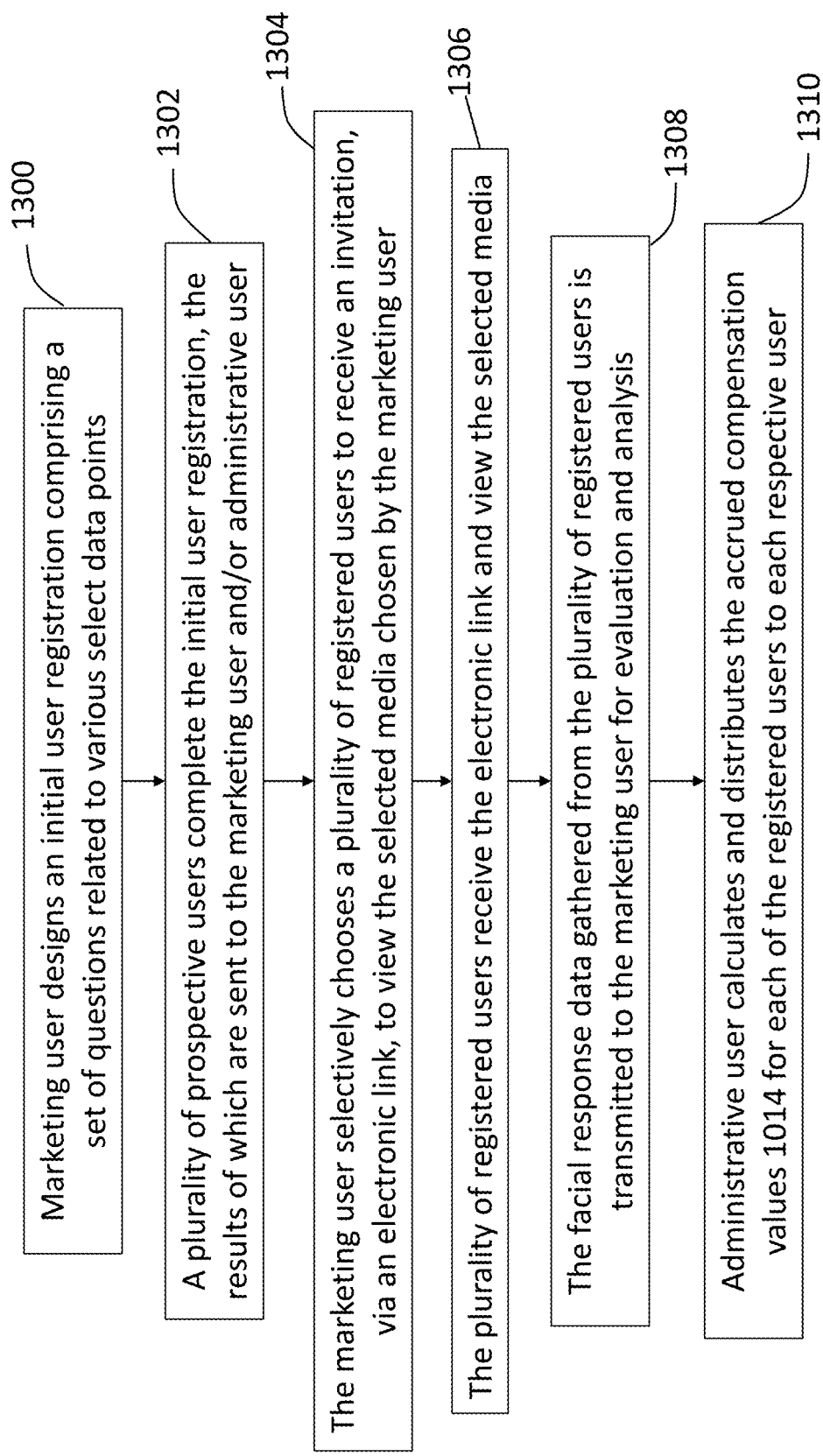
FIG. 13 is a process flow diagram depicting exemplary steps involved in implementing the method and system of objectively utilizing user facial expressions when viewing media presentations for evaluating a marketing campaign testing platform in accordance with one embodiment of the present invention.

FIG. 13 schematically illustrates one exemplary flow diagram outlining the general steps involved in use of the testing platform 1000. In a first Step 1300, a marketing user designs an initial user registration 1200 comprising a set of questions related to various select data points that are ideally related to the campaign or marketing effort of the marketing user. In a next Step 1302, a plurality of prospective users complete the initial user registration 1200, the results of which are sent to the marketing user and/or the administrative user. The administrative user may store all responses to the initial user registration 1200 in a central database or server for current and future use.

In a next Step 1304, the marketing user selectively chooses a plurality of registered users 58 to receive an invitation to view the selected media 1004 chosen by the marketing user. The contact information for the plurality of registered users 58*a-n* chosen by the marketing user will appear in the aggregate list 1006. In a preferred embodiment, the invitation will arrive in the form of an electronic access link, sent and received via an electronic mailing address, which the plurality of registered users 58*a-n* may access by simply clicking on the link and being directed to the appropriate web address. In other embodiments, however, the invitation and electronic link may be sent and/or received via a mobile application, social media account, or other electronic means. The aggregate list 1006 facilitates the selective and speedy transmission of an invitation, as transmission of the electronic link is nearly instantaneous once a marketing user selects the plurality of registered users 58*a-n* it wishes to send an invitation to. In another embodiment of the present invention, the central server 1108 receives, from the electronic computing device 1104*a-n* of the marketing user 1106*a-n*, and stores, on the central database 1108, the plurality of plurality of users 1102*a-n* having the electronic communication protocol associated therewith, the plurality of plurality of users 1102*a-n* designed by the marketing user 1106*a-n* to solely receive the digital media presentation. Further, the digital media viewing request may be communicated with the electronic communication protocol associated with the plurality of plurality of users 1102*a-n* through a networking interface operably associated with the central database 1108.

A further Step 1306 entails the receipt of the electronic link by the plurality of registered users 58*a-n* delineated in the aggregate list 1006. The plurality of registered users 58*a-n* may then view the selected media 1004 within the schedule delivery 1010 window. The process of viewing the selected media 1004 at this Step comprises the same steps as those outlined in FIG. 3. In one embodiment, the hyperlink for accessing and viewing the digital media presentation links to a database having the marketing review software application accessible for download to the plurality of mobile electronic computing devices 1100*a-n*. In other embodiment, the hyperlink for accessing and viewing the digital media presentation is done through a web-based platform, i.e., the hyperlink includes an html link directly to a webpage communicatively coupled to the central server 1108.

In a next Step 1308, the facial response data gathered from the plurality of registered users 58*a-n* is transmitted to the marketing user for evaluation and analysis. First, however, the software may prompt the at least one of the plurality of users 1102*a-n*, through the display screen, to elicit an intentional facial response of either a smile and a frown on the face of the at least one of the plurality of users 1102*a-n*, the smile and the frown associated with determining the user baseline. Additionally, the facial recognition software captures the intentional facial response and communicates the intentional facial response to the central database for association with one of the plurality of user accounts.

In another Step 1310, the administrative user calculates and distributes the accrued compensation values 1014 for each of the plurality of registered users 58*a-n* to each respective registered user 58. Additionally, the software is also operably configured to apportion digital temporal segments within the viewing interval that are associated with at least one of the plurality of facial expressions of the at least one of the plurality of users 1102*a-n*. These digital temporal segments are operably configured for access on a user interface operably coupled with the electronic computing device 1104*a*-*n* of the marketing user 1106*a*-*n* for review and analyzing. Said another way, these digital temporal segments enable the marketing user to analyze which segments of the digital media presentation the plurality of users 1102*a*-*n* found enjoyable, distasteful/unfavorable, without any reaction, etc.

Figure 14:
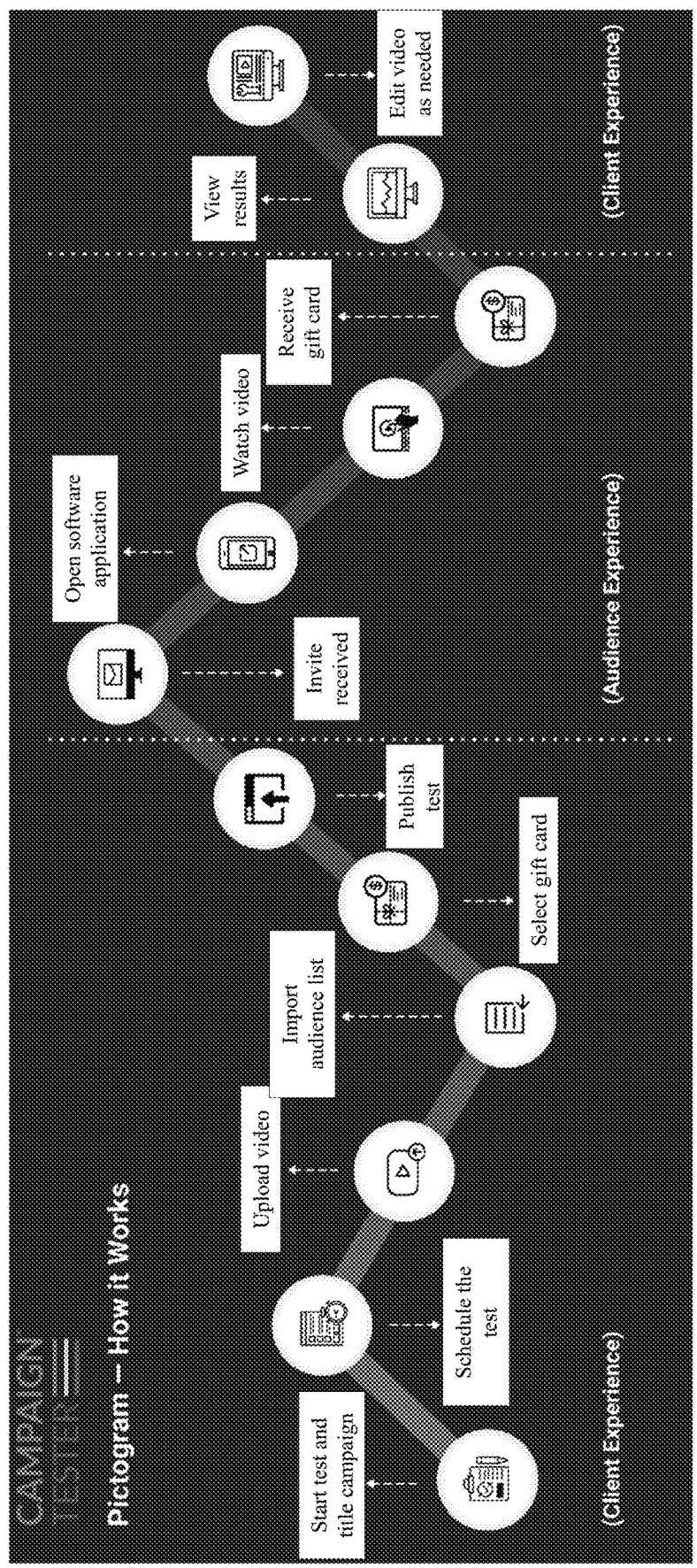
FIG. 14 is a schematic flow diagram depicting the method and system of objectively utilizing user facial expressions when viewing media presentations for evaluating a marketing campaign testing platform in accordance with one embodiment of the present invention.

FIG. 14 schematically illustrates a visually different flow diagram, also outlining the general steps involved in use of the testing platform 1000, as described in greater detail above.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. A computer-implemented method of utilizing user facial expressions when viewing digital media over a network for evaluating a marketing campaign:
providing a plurality of mobile electronic computing devices for a plurality of users, each of the plurality of mobile electronic computing devices with a display screen, a camera, and a media player;
providing an electronic computing device of a marketing user;
providing a central database communicatively coupled with the plurality of mobile electronic computing devices and the electronic computing device of the marketing user over a network;
receiving and storing, on the central database, a digital media presentation from the electronic computing device of the marketing user and a plurality of user accounts each respectively associated with a plurality of users respectively associated with the plurality of mobile electronic computing devices, the plurality of plurality of users having an electronic communication protocol associated therewith;
communicating a digital media viewing request to the plurality of plurality of users using the respective electronic communication protocol associated therewith, the digital media viewing request having an associated hyperlink for accessing and viewing the digital media presentation;
initiating a marketing review software application resident on the plurality of mobile electronic computing devices, through the digital media viewing request, the marketing review software application having eye-tracking software and facial recognition software operably configured to recognize a plurality of facial expressions of a user with a user baseline;
confirming sight by at least one of the plurality of users using the eye-tracking software and using the camera;
publishing, on the at least one of the plurality of users and through the marketing review software application, the digital media presentation through the media player on the display screen for a viewing interval;
while confirming sight of the at least one of the plurality of users and during the viewing interval, capturing and recording, through the facial recognition software, at least one of the plurality of facial expressions of the at least one of the plurality of users; and
communicating the at least one of the plurality of facial expressions of the at least one of the plurality of users to the electronic computing device of the marketing user for review and analyzing.

2. The method according to claim 1, wherein:
the hyperlink for accessing and viewing the digital media presentation links to a database having the marketing review software application accessible for download to the plurality of mobile electronic computing devices.

3. The method according to claim 1, further comprising:
receiving, from the electronic computing device of the marketing user, and storing, on the central database, the plurality of plurality of users having the electronic communication protocol associated therewith, the plurality of plurality of users designed by the marketing user to solely receive the digital media presentation.

4. The method according to claim 3, further comprising:
communicating the digital media viewing request to the electronic communication protocol associated with the plurality of plurality of users through a networking interface operably associated with the central database.

5. The method according to claim 4, further comprising:
communicating a digital gift card redemption link along with the digital media viewing request to the electronic communication protocol associated with the plurality of plurality of users, the digital gift card redemption link accessible only after completed viewing of the digital media presentation.

6. The method according to claim 1, further comprising:
prompting the at least one of the plurality of users, through the display screen, to elicit an intentional facial response of either a smile and a frown on the face of the at least one of the plurality of users, the smile and the frown associated with determining the user baseline.

7. The method according to claim 6, further comprising:
capturing, through the facial recognition software, the intentional facial response and communicating the intentional facial response to the central database for association with one of the plurality of user accounts.

8. The method according to claim 7, wherein:
the facial expression of the at least one of the plurality of users is at least one of a frown and a smile.

9. The method according to claim 1, further comprising:
apportioning digital temporal segments within the viewing interval that are associated with at least one of the plurality of facial expressions of the at least one of the plurality of users, the digital temporal segments operably configured for access on a user interface operably coupled with the electronic computing device of the marketing user for review and analyzing.

* * * * *